W. D. C. WRIGHT.
INTERNAL COMBUSTION ENGINE.
APPLICATION FILED FEB. 19, 1913.
1,095,485.
Patented May 5, 1914.
2 SHEETS—SHEET 1.
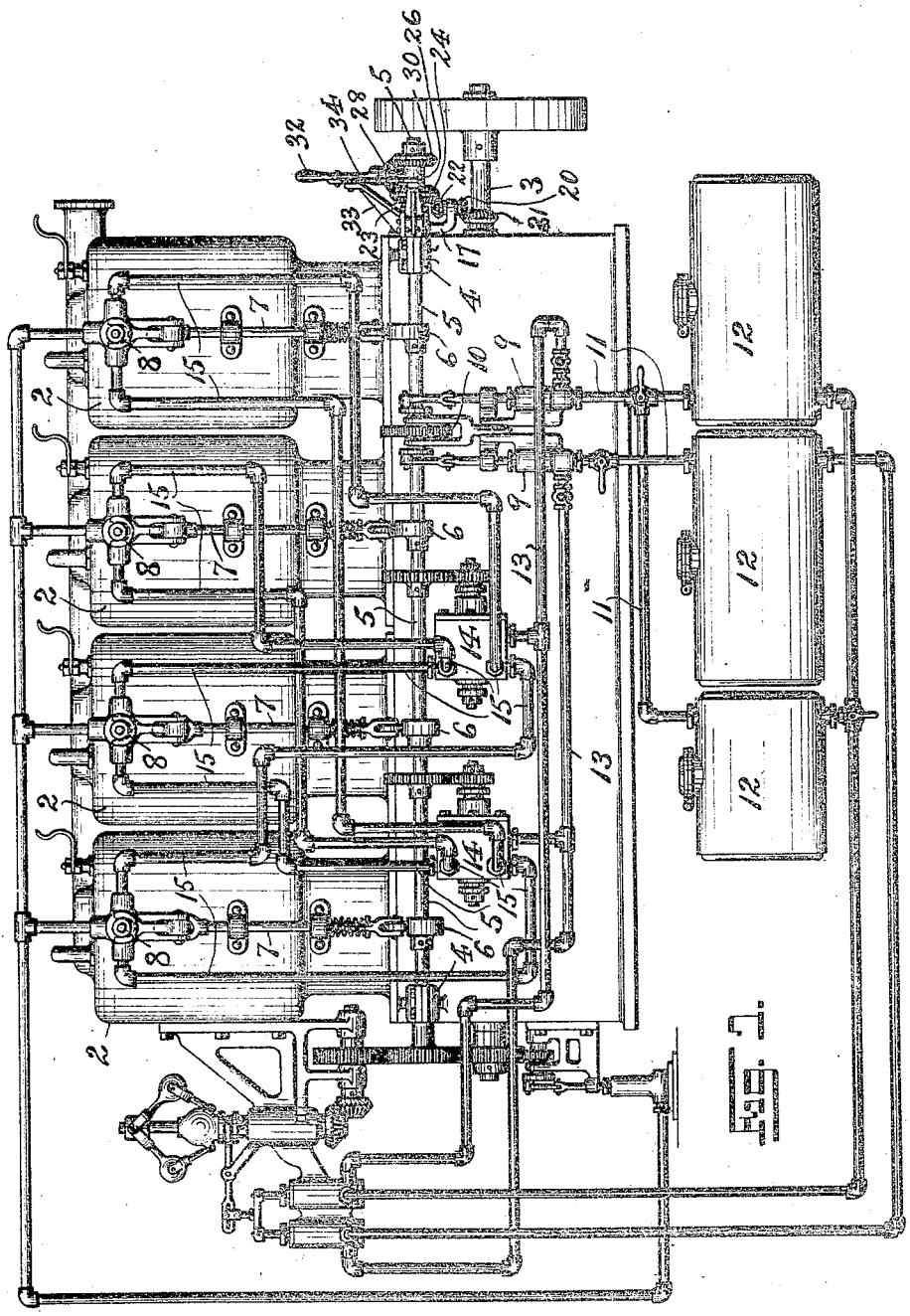
WITNESSES:
INVENTOR
Wilson D. Craig Wright
BY
ATTORNEYS

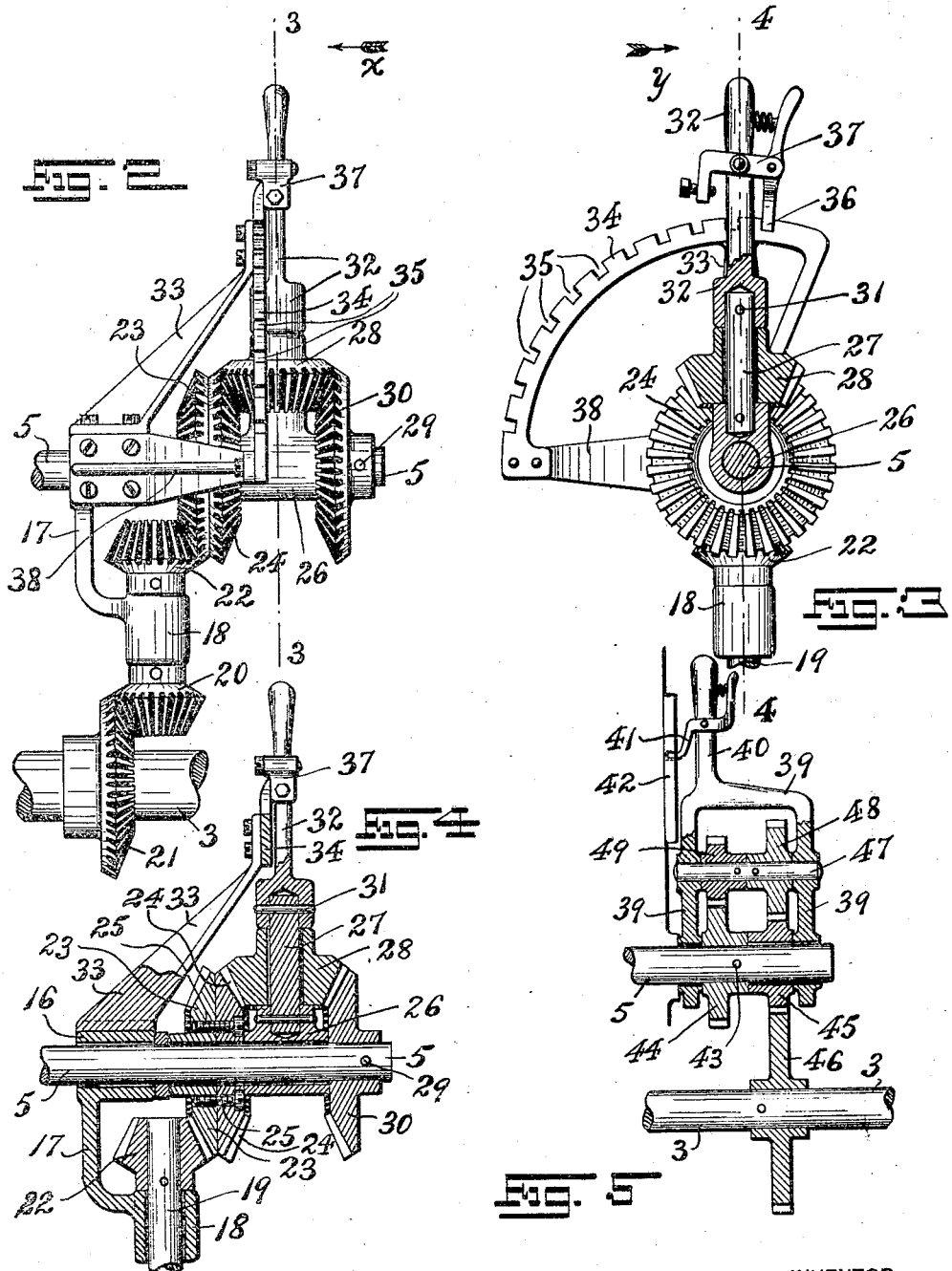

UNITED STATES PATENT OFFICE.

WILSON D. CRAIG WRIGHT, OF PHILADELPHIA, PENNSYLVANIA, ASSIGNOR OF ONE-HALF TO JOSEPH WRIGHT, OF GERMANTOWN, PHILADELPHIA, PENNSYLVANIA.

INTERNAL-COMBUSTION ENGINE.

1,095,485.

Specification of Letters Patent.

Patented May 5, 1914.

Application filed February 19, 1913. Serial No. 749,393.

*To all whom it may concern:*

Be it known that I, WILSON D. CRAIG WRIGHT, citizen of the United States, residing at Philadelphia, in the county of Philadelphia and State of Pennsylvania, have invented certain new and useful Improvements in Internal-Combustion Engines; and I do hereby declare the following to be a full, clear, and exact description of the invention, such as will enable others skilled in the art to which it appertains to make and use the same, reference being had to the accompanying drawings, and to characters of reference marked thereon, which form a part of this specification.

The present invention has reference, generally, to improvements in internal combustion engines; and the invention relates, more particularly, to improved means for controlling the fuel admission, speed and power of internal combustion engines, of the hydrocarbon or other types.

The invention has for its principal object to provide a novel and simply constructed means connected with the crank-shaft and cam-shaft which actuates the fuel admission valve of the cylinders, and by means of which a wide range of timing the moment of admitting the fuel is easily secured, and varied while the engine is running, also permitting the time of fuel admission to be varied to suit the conditions consequent upon the load or work thrown upon the engine. The said novel controlling means also provides an easy means for obviating pre-ignition due to a too early admission of fuel, and other similar evils.

The mechanism embodying the principles of the present invention may be applied to the type of hydrocarbon engines using light and heavy fuels, whereby a late admission of fuel permits the use of light or easily volatilized fuels, such as gasolene or alcohol, which require lower compression. The engine will thus operate on such light fuels, even though by its design its compression ratio is much too high for them. The light fuel, in such case, would be admitted late in the stroke so that it would enter the cylinder at a period when the compression pressure had fallen, the charge so admitted being fired by electric spark ignition. When the engine had warmed up, and its hot tube igniter had reached a proper temperature, the lighter fuel may be discontinued, and the heavier fuel admitted in its place, the timing of the admission being advanced to suit the heavy fuel conditions while the engine is running. It will be readily understood that such operations cannot be produced by any mechanism in which the crank-shaft and cam-shaft remain always in the same fixed time relation.

The mechanism embodying the present invention may be applied to the type of engine in which the cam-shaft serves to control the fuel admission valves, and also to operate a pump or pumps and distributers for propelling the fuel elements to the valves, so that when the time of admission of fuel through the valves is changed by the operation of the novel controlling mechanism, the operation of the pumps and distributers are also varied in accordance with such change.

Other objects of the present invention not at this time more particularly enumerated will be clearly understood from the following detailed description of the same.

With the various objects of the present invention in view, the said invention consists, primarily, in the novel construction of means for advancing or retarding the driven relation of the cam-shaft to the crank-shaft of the engine for the purpose of advancing or retarding the admission of fuel to the engine cylinder, substantially as hereinafter set forth; and the invention consists, furthermore, in the novel arrangements and combinations of devices and parts, as well as in the details of the construction of the same, all of which will be more fully described in the following specification, and then finally embodied in the clauses of the claims which are appended to and which form an essential part of the said specification.

The invention is clearly illustrated in the accompanying drawings, in which:—

Figure 1 is a side elevation of a hydrocarbon engine equipped with the novel construction of timing mechanism made according to and embodying the principles of the present invention. Fig. 2 is a large detail view of the novel construction of timing mechanism embodying the principles of the present invention; Fig. 3 is a detail transverse section of the same, taken on line 3—3 in said Fig. 2 looking in the direction of the arrow X; and Fig. 4 is a detail longitudinal section of the same, taken on line 4—4 in said Fig. 3 looking in the direction of the arrow y. Fig. 5 is a detail longitudinal section of a slightly modified construction of the novel timing mechanism, still embodying, however, the principles of the present invention.

Similar characters of reference are employed in all of the hereinabove described views to indicate corresponding parts.

Referring now to the said drawings, the reference-character 1 indicates a hydrocarbon engine, provided with the cylinder 2, and having the usual crank-shaft 3. Connected with said engine, and suitably journaled in bearing portions 4, is a lay or cam-shaft 5, upon which are fixed the cam-members 6, which operate the connecting-rods 7 whereby the moving parts of fuel admission valves 8 connected with the cylinders 2 are operatively controlled.

The reference character 9 indicates pump mechanisms which are operated through the gearing 10 connected with said lay or cam-shaft 5. Said pump mechanisms are connected by suitable pipes 11 with the tanks 12 containing the supply of fuel elements, and serve to draw said fuel elements from said tanks and propel the same through the pipes 13 to suitable distributing devices 14, also connected and operated by gearing to said lay or cam-shaft 5. The said fuel elements under the propulsion of said pump mechanisms passing through said distributing devices, and thence passing through delivery pipes 15 to said admission valves 8, whereby they gain admission to the engine cylinders. Connected with said hydrocarbon engine, preferably adjacent to one end of said lay or cam-shaft 5 is a bracket-member 16, provided with a downwardly extending arm 17 supporting at its lower end a vertical bearing 18. Journaled in said vertical bearing 18 is a vertical spindle 19, upon the lower end of which is fixed a pinion 20 which meshes with a bevel gear 21, either affixed to or driven by the engine crank-shaft 3. Fixed upon the upper end of said vertical spindle 19 is another pinion 22. Journaled upon said lay or cam-shaft 5, so as to rotate freely thereon is an idler bevel-gear 23 which meshes with and is driven by said pinion 22. Connected with said idler bevel-gear 23 so as to move in company therewith, is an oppositely facing bevel-gear 24, the same being secured to said bevel-gear 23 by means of bolts or screws 25, or any other suitable fastening means, or the said bevel-gears 23 and 24 may be made integral. Pivotally connected with said lay or cam-shaft 5 by means of its pivot bearing piece 26 is a swinging spindle 27, the same being adapted to be oscillated upon said lay or cam-shaft as a center. Mounted upon said swinging spindle 27, so as to turn freely thereon, is an idler pinion 28, the same meshing operatively with said bevel-gear 24. Secured upon said lay or cam-shaft 5 by means of a pin 29, or other suitable fastening means, so as to turn with said lay or cam-shaft, is a fixed bevel-gear 30 which also meshes operatively with the opposite side of said idler-pinion 28. Connected with the upper free end of said swinging spindle 27, by means of a pin 31, or any other suitable fastening means is an upwardly extending handle-member or hand-lever 32 adapted to produce the desired oscillation of said swinging spindle 27 and said idler pinion 28 carried thereby. Secured to and extending upwardly from said bracket-member 16 is a bracket arm 33 to the upper end of which is secured a quadrant 34 provided with suitable stop-notches 35 adapted to engage the nose 36 of a holding dog or lock mechanism 37 which is pivotally connected with the upper end of said handle member or hand lever 32, and by the operation of which said swinging spindle 27 and its idler pinion 28 may be oscillated, and retained in any desired adjusted position at the end of its oscillation or movement. Said quadrant 34 is further supported in a proper operative position and relation to said handle member or hand lever 32 by means of another bracket arm 38 which is secured to and extends outwardly from said bracket member 16, so that the lower end of said quadrant may be suitably secured thereto.

In the accompanying drawings the mechanism above described is shown in its initial or normally adjusted position, and the same operates to transmit the power from the crank shaft 3 of the engine to the lay or cam-shaft 5, as follows:—The crank shaft 3 being rotated by the reciprocation of the pistons of the engine, in the usual manner, rotates said bevel gear 21 which is fixed in connection therewith, this bevel gear drives the pinion 20, and spindle 19, and consequently the pinion 22. The pinion 22 thus rotated transmits its movement to the oppositely facing idler bevel gears 23 and 24, and the said idler pinion 28 being in mesh with the bevel gear 24 it also is rotated and is caused to transmit its movement to said bevel gear 30. Since said bevel gear 30 is secured upon or fixed to said cam-shaft 3 it follows that the latter will thereupon be rotated. It will of course be clearly understood that the relative ratio of the members of the above described train of gears may be so determined and arranged as to produce the desired relative rotation of the said cam shaft to the said crank shaft. The cam shaft 5 being thus rotated its cam member will operate in proper time relation to the normal piston movement the fuel admission valve mechanisms. It will also be understood that the cam shaft with its cam members is rotated to operate said fuel admission valve mechanisms so that the same will open when the piston of the cylinder has, during its reciprocation, arrived at a proper position to compress the entering fuel charge. It follows then that, for the purposes of better engine control and fuel economy, it is often desirable to retard or advance the admission of the fuel charge to the engine cylinder, so that the same enters the firing chamber later or earlier during the stroke of the piston. Such being the case it is necessary to shift the position of the cam-shaft with relation to its driving means to delay or advance the operation of the cam members connected therewith, and this is the operation which is sought to be accomplished by the mechanism which comprises the present invention. The mechanism above described operates, to accomplish this function, as follows:—When it is desired to retard the operation of said cam shaft and its cam members the hand-lever 32 is released from the quadrant 34 and swung downwardly, which operation oscillates or swings said swinging spindle 27 with it carrying the said idler pinion 28 along. The said bevel gear 24, with which said pinion 28 meshes, having a fixed geared relation to said crank-shaft 3, the same may be considered as fixed or stationary, having regard to the adjusting movement of the mechanism, even though the same may be, at the time of operation, or while the engine is running, rotating. It follows then that the idler pinion 28, when thus swung downwardly with the swinging spindle 27, will roll upon said bevel gear 24. The rolling movement of said idler pinion 28 operates to turn backward said fixed bevel gear 30 which is secured to said cam-shaft 5, and consequently also turns backward said cam-shaft 5 together with the cam members of the same, thus delaying or retarding the operation of said cam-members upon the fuel admission valve-mechanism, and any other fuel control mechanism which may be operated from said cam-shaft 5. When the desired amount or time of retardation or delay has been accomplished in this way, the hand lever 32 is again locked in connection with said quadrant 34, so that the delayed operation of said cam-members of the cam-shaft with relation to the piston movement of the engine will continue until another change or adjustment is desired. An opposite movement or oscillation of said hand-lever 32 reverses the operations above described, and consequently again advances the operation of the cam-shaft and its cam-members with relation to the piston movements.

Referring now to Fig. 5 of the accompanying drawings, there is illustrated therein a slightly modified construction of mechanism still embodying, however, the principles of the present invention. In this construction the reference character 3 indicates the crank-shaft of the engine, and 5 the cam-shaft. Mounted to oscillate or swing upon said cam-shaft 5 as a center is a swing-frame 39 provided with a hand lever 40. Said hand lever 40 has a latch mechanism 41 adapted to engage a fixed quadrant plate 42 to hold said hand-lever and swing frame in any desired adjusted position. Secured upon said cam-shaft 5, by means of a pin 43, or any other suitable fastening means is a fixed gear wheel 44. Also mounted loosely upon said cam-shaft 5 adjacent to said gear-wheel 44 is an idler gear wheel 45 adapted to turn freely upon said cam-shaft. Secured upon said crank-shaft 3 is a gear wheel 46 which immediately, or through the interposition of any desirable train of gearing or like transmission mechanism, transmits the rotation or movement of said crank-shaft 3 to said idler gear-wheel 45. Journaled in said swing-frame 39 is a spindle 47. Fixed upon said spindle 47 is a gear-wheel 48 which meshes with said idler gear wheel 45, and also fixed upon said spindle 47 is a gear-wheel 49 which meshes operatively with said gear-wheel 44 fixed upon said cam-shaft 5. When the crank-shaft 3 rotates its fixed gear-wheel 46 rotates said idler gear-wheel 45, which in turn rotates said gear-wheel 48, spindle 47 and gear-wheel 49, the latter transmitting the movement to said gear-wheel 44 and said cam-shaft 5. It will of course be also understood that the relative ratio of the members of this gear train may be so determined and arranged as to produce the desired relative rotation of said cam-shaft to the said crank-shaft. The said mechanism above recited serves to adjust or shift said cam-shaft and its cam-members with relation to the crank-shaft as follows:—When it is desired to make such an adjustment the swing-frame 39 is oscillated or swung downward. The said gear-wheel 46 on said crank-shaft may be considered with regard to the adjusting movement as fixed or stationary, and the idler gear-wheel 45 which is geared or meshed therewith may also be so regarded. Then as the swing-frame moves or swings downward it rolls said gear-wheel 48 upon said idler gear-wheel 45 thereby rotating said spindle 47 and said gear-wheel 49, the rotation of the latter being imparted to the gear-wheel 44 secured to the cam-shaft, whereby the latter and its cam-members is shifted with relation to said crank-shaft, and consequently with relation to the piston movements of the engine. Of course opposite adjusting effects will be secured by swinging or oscillating said swing-frame in the opposite direction. It therefore is evident that all the results and benefits of such adjustment are obtained, as heretofore pointed out.

I am aware that some changes may be made in the arrangements and combinations of the various devices and parts, as well as in the details of the construction of the same, without departing from the scope of the present invention, as defined in the appended claims. Hence, I do not limit my invention to the exact arrangements and combinations of the various devices and parts as illustrated in the accompanying drawings, and as described in the foregoing specification, nor do I confine myself to the exact details of the construction of the said parts.

I claim:—

1. An internal combustion engine having a crank-shaft and fuel admission mechanism, a time shaft for controlling said fuel mechanism, a bevel-gear fixed upon said time shaft, a double faced idler bevel-gear loosely mounted on said time shaft, a swinging-spindle pivotally connected with said time shaft between said fixed bevel-gear and said double faced idler bevel-gear, an idler pinion mounted on said swinging-spindle, said idler pinion meshing both with one face of said double faced idler bevel-gear and with said fixed bevel-gear whereby the rotation of the former is transmitted to the latter, a gear fixed upon and driven by said crank-shaft, and intermediate gearing between said gear and the opposite or other face of said double faced idler bevel-gear for driving the latter.

2. An internal combustion engine having a crank-shaft and fuel admission mechanism, a time shaft for controlling said fuel admission mechanism, a bevel-gear fixed upon said time shaft, a double faced idler bevel-gear loosely mounted on said time shaft, a swinging-spindle pivotally connected with said time shaft between said fixed bevel-gear and said double faced idler bevel-gear, an idler pinion mounted on said swinging spindle, said idler pinion meshing both with one face of said double faced idler bevel-gear and with said fixed bevel-gear whereby the rotation of the former is transmitted to the latter, a gear fixed upon and driven by said crank-shaft, intermediate gearing between said gear and the opposite or other face of said double faced idler bevel-gear for driving the latter, a handle member connected with said swinging-spindle for oscillating or swinging the same and said idler pinion mounted thereon, and means for securing said swinging-spindle and its idler pinion in any desired adjusted position to which it has been moved.

3. An internal combustion engine having a crank-shaft and fuel admission mechanism, a time shaft for controlling said fuel admission mechanism, a bevel-gear fixed upon said time shaft, a double faced idler bevel-gear loosely mounted on said time shaft, a swinging-spindle pivotally connected with said time shaft between said fixed bevel-gear and said double faced idler bevel-gear, an idler pinion mounted on said swinging-spindle, said idler pinion meshing both with one face of said double faced idler bevel-gear and with said fixed bevel-gear whereby the rotation of the former is transmitted to the latter, a gear fixed upon and driven by said crank-shaft, intermediate gearing between said gear and the opposite or other face of said double faced idler bevel-gear for driving the latter, a handle member connected with said swinging-spindle for oscillating or swinging the same and said idler pinion mounted thereon, and means for securing said swinging-spindle and its idler pinion in any desired adjusted position to which it has been moved comprising a stationary notched quadrant, and a releasable catch mechanism connected with said handle member adapted to engage the notches of said quadrant.

In testimony, that I claim the invention set forth above I have hereunto set my hand.

WILSON D. CRAIG WRIGHT.

Witnesses:
J. E. HAAS,
LORENZO J. RILEY.